(12) United States Patent
Fisher

(10) Patent No.: US 12,530,807 B2
(45) Date of Patent: Jan. 20, 2026

(54) METHODS AND SYSTEMS FOR COMPRESSING DIGITAL ELEVATION MODEL DATA

(71) Applicant: onXmaps, Inc., Missoula, MT (US)

(72) Inventor: Lance Fisher, Missoula, MT (US)

(73) Assignee: onXmaps, Inc., Missoula, MT (US)

( * ) Notice: Subject to any disclaimer, the term of this patent is extended or adjusted under 35 U.S.C. 154(b) by 238 days.

(21) Appl. No.: 18/134,270

(22) Filed: Apr. 13, 2023

(65) Prior Publication Data

US 2023/0368427 A1 Nov. 16, 2023

Related U.S. Application Data

(63) Continuation of application No. PCT/US2023/016964, filed on Mar. 30, 2023.

(60) Provisional application No. 63/327,036, filed on Apr. 4, 2022.

(51) Int. Cl.
*G06T 9/00* (2006.01)
*G06T 17/05* (2011.01)

(52) U.S. Cl.
CPC .............. *G06T 9/00* (2013.01); *G06T 17/05* (2013.01)

(58) Field of Classification Search
CPC ....... G06T 9/00; G06T 17/05; G01C 21/3867; G09B 29/106; H04N 19/182; H04N 19/593; H04N 19/105
See application file for complete search history.

(56) References Cited

U.S. PATENT DOCUMENTS

| RE47,243 E * | 2/2019 | Alshina ................. H04N 19/11 |
| 10,359,518 B2 | 7/2019 | Wheeler |
| 2002/0071487 A1* | 6/2002 | Kutka ................... H04N 19/34 |
| | | 375/240.03 |

(Continued)

FOREIGN PATENT DOCUMENTS

| WO | WO-9706512 A2 | 2/1997 |
| WO | WO-2023196163 A1 | 10/2023 |

OTHER PUBLICATIONS

Sefercik, Umut & Jacobsen, Karsten. (2007). Quality assessment of InSAR digital elevation models. (Year: 2007).*

(Continued)

*Primary Examiner* — Kee M Tung
*Assistant Examiner* — Nauman U Ahmad
(74) *Attorney, Agent, or Firm* — Wilson Sonsini Goodrich & Rosati

(57) ABSTRACT

The present disclosure provides methods and systems for compressing map data. Provided here is a system for reducing network traffic by compressing map data, comprising: a data set receiver configured to obtain first two or more values associated with first two or more pixels; a prediction difference recorder configured to: (a) predict a next value associated with a next pixel based on the first two or more values, wherein the next pixel is immediately adjacent to one of the first two or more pixels; (b) predict a further next value associated with a further next pixel based on previous two or more values associated with previous two or more pixels, wherein the further next pixel is immediately adjacent to one of the previous two or more pixels; and (c) record an error in the predicted next value and in the predicted further next value; a render engine configured to encode the recorded error into colors.

18 Claims, 7 Drawing Sheets

(56) References Cited

U.S. PATENT DOCUMENTS

| | | | | |
|---|---|---|---|---|
| 2003/0093411 | A1* | 5/2003 | Minor | G06F 18/2321 |
| 2007/0002138 | A1* | 1/2007 | Oldroyd | G06T 17/05 |
| | | | | 348/143 |
| 2008/0133554 | A1 | 6/2008 | Lee et al. | |
| 2009/0092324 | A1* | 4/2009 | Lee | H04N 19/154 |
| | | | | 382/232 |
| 2013/0328937 | A1 | 12/2013 | Pirwani et al. | |
| 2015/0365682 | A1* | 12/2015 | Amon | H04N 19/169 |
| | | | | 375/240.02 |
| 2017/0019684 | A1 | 1/2017 | Ostrovskiy et al. | |
| 2019/0080516 | A1 | 3/2019 | Petrovskaya et al. | |
| 2019/0156566 | A1 | 5/2019 | Chen et al. | |
| 2019/0287298 | A1* | 9/2019 | Morris | G01V 1/34 |
| 2019/0339828 | A1 | 11/2019 | Abramson et al. | |
| 2020/0116865 | A1 | 4/2020 | Yang et al. | |
| 2020/0193701 | A1* | 6/2020 | Ely | G06V 10/7515 |
| 2020/0242811 | A1 | 7/2020 | Wang et al. | |
| 2022/0094910 | A1* | 3/2022 | Jiang | H04N 19/159 |
| 2023/0206408 | A1* | 6/2023 | Sukhov | G06T 17/05 |
| | | | | 382/113 |

OTHER PUBLICATIONS

T. Goulden, C. Hopkinson, R. Jamieson, S. Sterling, Sensitivity of DEM, slope, aspect and watershed attributes to LiDAR measurement uncertainty, Remote Sensing of Environment, vol. 179, 2016, pp. 23-35, ISSN 0034-4257, https://doi.org/10.1016/j.rse.2016.03.005, (Year: 2016).*

Bolstad, Paul V., and Timothy Stowe. "An evaluation of DEM accuracy: elevation, slope, and aspect." Photogrammetric Engineering & Remote Sensing 60.11 (1994): 7327-7332. (Year: 1994).*

Kinder et al. Advances in the data compression of digital elevation models. Computers & Geosciences 29:985-1002 (2003).

PCT/US2023/016964 International Search Report and Written Opinion dated Jul. 31, 2023.

Access elevation data, mapbox, https://docs.mapbox.com/data/tilesets/guides/access-elevation-data/, accessed on Aug. 7, 2023.

Andujar, Topographic Map Visualization from Adaptively Compressed Textures, Eurographics/IEEE-VGTC Symposium of Visualization, 29(3): 10 pages (2010).

Compressor Head, YouTube, uploaded by Google for Developers (Apr. 2016), www.https://www.youtube.com/playlist?list=PLOU2XLYxmsIJGErt5rrCqaSGTMyyqNt2H.

Google for Developers, Compression Techniques (Jun. 2023), https://developers.google.com/speed/webp/docs/compression.

Inanc, Compressing Terrain Elevation Datasets, A Thesis Submitted to the Graduate Faculty of Rensselaer Polytechnic Institute, Troy, New York, 72 pages (May 2008).

Jupyter Notebooks in VS Code, Visual Studio Code (Jan. 9, 2023), https://code.visualstudio.com/docs/datascience/jupyter-notebooks.

Mapzen Terrain Tiles are 1.0 and ready to go, Mapzen, https://www.mapzen.com/blog/terrain-tile-service/, accessed on Aug. 7, 2023.

Overview of JPEG XL, JPEG, https://developers.google.com/speed/webp/docs/compression, accessed date Aug. 8, 2023.

Salomon, Handbook of Data Compression, Springer London, Edition No. 5:1361 pages (Nov. 2009)—Table of Contents only.

* cited by examiner

| 12080 | 40 | 8 | 8 | 8 | 0 | 0 | 24 | 24 | 40 |
| --- | --- | --- | --- | --- | --- | --- | --- | --- | --- |
| 8 | 32 | 0 | 24 | -8 | 0 | 8 | 32 | 8 | 40 |
| 0 | 0 | 4 | 4 | 8 | 4 | 36 | 36 | 0 | 4 |
| 0 | 0 | 0 | 12 | 20 | 4 | 36 | 20 | -32 | 8 |
| 8 | -8 | 20 | 20 | 8 | -16 | -4 | -40 | -48 | 4 |
| -8 | 16 | 28 | 32 | 20 | 16 | 16 | -8 | -20 | -8 |
| -8 | 0 | -4 | 32 | -16 | -44 | -24 | 16 | 16 | 8 |
| 128 | -8 | 20 | -4 | -68 | -88 | -40 | -36 | -4 | 4 |
| 32 | 136 | -16 | 60 | 16 | -32 | -44 | -36 | -32 | -20 |
| 8 | 40 | 56 | 32 | 48 | 64 | -32 | -44 | -4 | -12 |

METHODS AND SYSTEMS FOR COMPRESSING DIGITAL ELEVATION MODEL DATA

CROSS-REFERENCE

This application claims priority to International Application No. PCT/US2023/016964, filed Mar. 30, 2023, which claims priority to U.S. Provisional Patent Application No. 63/327,036, filed on Apr. 4, 2022, both of which are incorporated herein by reference in their entirety for all purposes.

BACKGROUND

Digital elevation model (DEM) is a three-dimensional (3D) computer graphics representation of elevation data to represent terrain. Often, DEMs are used in geographic information systems, and are common basis for digitally-produced terrain maps. Existing compression techniques for DEM data set include conventional image compression methods. Some image compression methods may use complex algorithms, such EZW, SPIHT, and the like. These image compression methods use tree structure and require the image size to be $2^n$ or pre-processing to normalize the image size to be $2^n$. These algorithms are very computationally intense and require mass memory storage.

SUMMARY

Methods and systems for reducing network traffic by compressing digital elevation model data provided herein may advantageously reduce memory storage required to compress and store map data. The digital elevation model (DEM) may comprise a matrix of numbers, each represents a height (e.g., elevation value) corresponding to a location point. The methods and systems provided herein may utilize estimates, predictions of the value associated with pixels next to one another in the matrix of number representing the DEM data set. The data in the matrix of numbers from a DEM is often rendered in visual form to make it understandable to humans. The matrix of numbers from a DEM is the data set of the DEM, and the efficiency associated with the storage, transmission, and processing of the DEM data set depends heavily on the volume (i.e., size) of the DEM data set. Existing compression techniques for DEM data set may comprise converting regular gridded DEM to triangular irregular network (TIN) DEM, using entropy encoding directly on the DEM data set, using conventional image compression algorithms, etc. However, these compression techniques/methods cannot provide tailored compression for specific types of DEM data set, i.e., these conventional compression methods do not account for the characteristics of the DEM data set.

As described elsewhere herein, the data in the matrix of numbers may be rendered in a visual form to provide a human-comprehensible visualization. This visualization may be in a form of a contoured topographic map, or use shadings and colors to render elevation information as represented by visually distinct format, such as colors. In the scenario of providing a DEM for a mountain range, there are several factors should be considered. For example, a mountain range largely consists of a number of slopes, and these slopes may be in same or similar degree of leaning or tilting for most portions of them. The sudden changes in the degree of tilting, for example, a cliff, would be represented in the DEM visualization in a graphically-distinct manner, such as by a different color than the other portions of the slope. In another word, the DEM data set for a mountain range, i.e., representing elevations on different location points, may contain a large amount of numbers (values) in the matrix that are predictable. The DEM data set for the mountain range, therefore, has certain characteristics that should be considered, and used to structure a more sophisticated manner of data compression. In another example, the DEM data set may be for a flat ground area, wherein most numbers in the DEM data set matrix are essentially the same or similar to each other. In this instant, similarly, a large amount of numbers (values) in the matrix are predictable. The DEM data set for the flat ground range, therefore, has certain characteristics that should be considered, and used to structure a more sophisticated manner of data compression for the DEM data.

Conventional compression techniques/methods lack account for the characteristics associated with certain DEM data set, and therefore cannot provide tailored compression for specific types of DEM data set.

The method and systems provided herein may provide the advantages of reducing the transmission burden and storage requirement by taking account the characteristics associated with mountain range DEM data set. It also may provide very little computation overhead when compressing the DEM data set. By capitalizing on the inherent features and or characteristics of the terrain, the method and systems described herein may streamline data processing, resulting in a more seamless user experience. This is especially desirable in situations where outdoor activities such as hunting, hiking, or camping are involved, access to high-speed internet and robust data transmission may be limited. In such scenarios, minimizing the network traffic and the amount of data transmitted can vastly improve the overall user experience. The method and systems provided herein may achieve this goal by efficiently extracting and representing the essential features of the terrain. This approach may reduce the transmission burden by reducing network traffic.

In addition to the advantages mentioned elsewhere herein, comparing to conventional compression methods, the methods and systems provided herein may also offer the following advantages. By compressing DEM data sets, more data can be stored within the available storage capacity (e.g., local, cloud, etc.), leading to more efficient use of storage resources. With compressed DEM data sets, the processing time for certain tasks, such as the data exchange (e.g., downloading) time for the digital map represented by the DEM data sets, can be reduced. It may also reduce battery usage on mobile devices because of the data size reduction, and may also reduce the storage requirement on a device. The method and systems provided herein may be scalable to larger data sets, enabling efficient compression of larger and more complex DEM data sets, which may not be possible with conventional compression techniques.

In an aspect, the present disclosure provides a system for reducing network traffic by compressing map data, comprising: a data set receiver configured to obtain first two or more values associated with first two or more pixels; a prediction difference recorder configured to: (a) predict a next value associated with a next pixel based on the first two or more values, wherein the next pixel is immediately adjacent to one of the first two or more pixels; (b) predict a further next value associated with a further next pixel based on previous two or more values associated with previous two or more pixels, wherein the further next pixel is immediately adjacent to one of the previous two or more pixels; (c) record an error in the predicted next value and in the predicted further next value; a render engine configured to encode the recorded error into colors.

In an aspect, the present disclosure provides a system for reducing network traffic by compressing map data, comprising: a data set receiver configured to obtain first two or more values associated with first two or more pixels; a prediction difference recorder configured to: (a) predict a next value associated with a next pixel based on the first two or more values, wherein the next pixel is immediately adjacent to one of the first two or more pixels; (b) predict a further next value associated with a further next pixel based on previous two or more values associated with previous two or more pixels, wherein the further next pixel is immediately adjacent to one of the previous two or more pixels; and (c) record an error in the predicted next value and in the predicted further next value; a render engine configured to encode the recorded error into colors.

In an aspect, the present disclosure provides a method for reducing network traffic by compressing map data using one or more computer processors, comprising: (a) obtaining, by the one or more computer processors, first two or more values associated with first two or more pixels; (b) predicting, by the one or more computer processors, a next value associated with a next pixel based on the first two or more values, wherein the next pixel is immediately adjacent to one of the first two or more pixels; (c) predicting, by the one or more computer processors, a further next value associated with a further next pixel based on previous two or more values associated with previous two or more pixels, wherein the further next pixel is immediately adjacent to one of the previous two or more pixels; (d) recording, by the one or more computer processors, an error in the predicted next value and in the predicted further next value; and (e) encoding the record error into colors.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
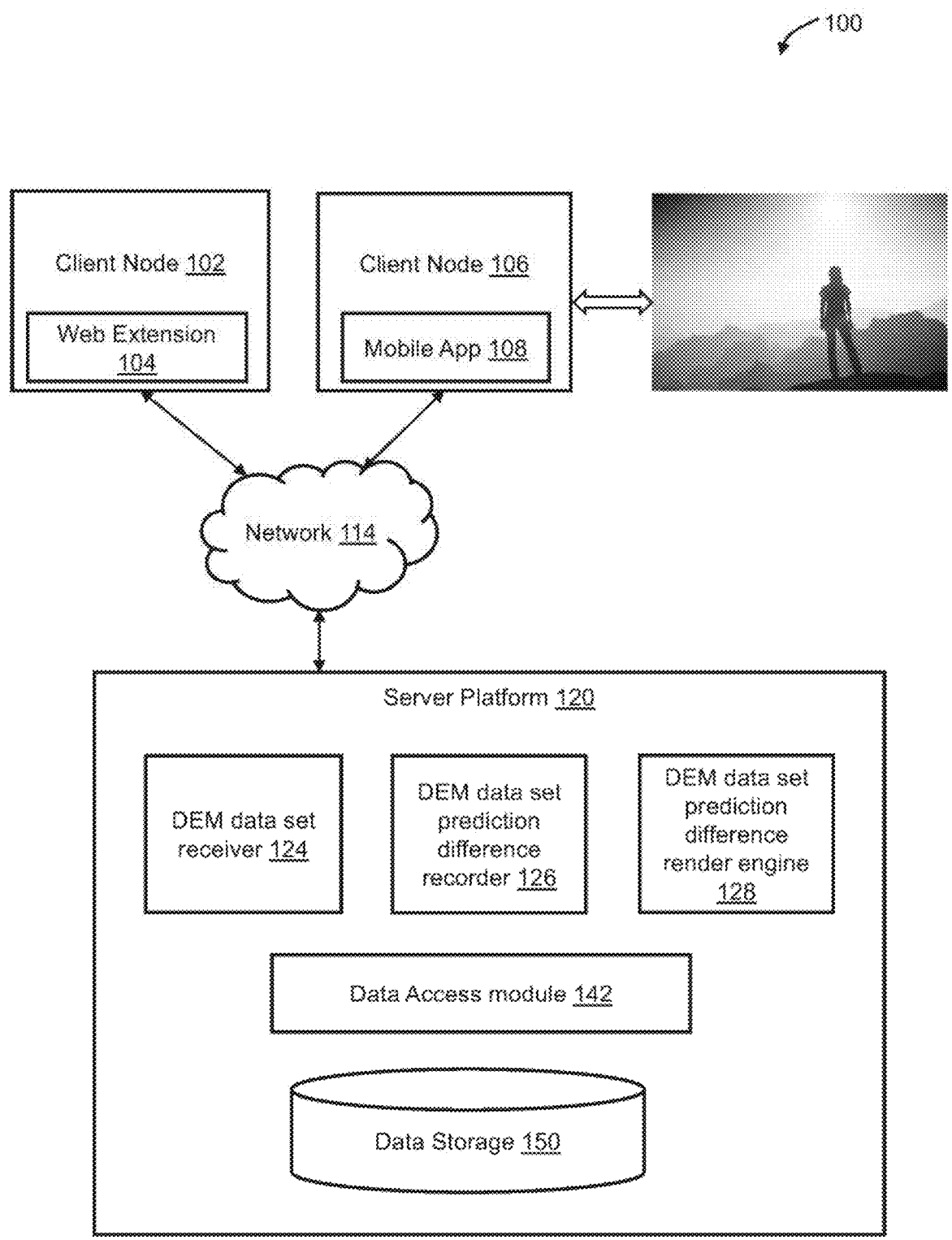
FIG. 1 is a block diagram depicting an example DEM data compression system 100, according to embodiments of the present disclosure, comprising a client-server architecture and network configured to perform the various methods described herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The DEM data set compression methods and systems provided herein may provide a faster, tailored, more reliable manner to compress DEM data. As described elsewhere herein, some DEM data sets may have certain characteristics that should be considered in the data compression process to provide better compression result (for example, better compression factor). The methods and systems provided herein take the DEM data set characteristics into consideration, making predictions based on the DEM data set characteristics, and recording the differences between predictions and the actual values. Compressing DEM data set in this manner, it reduces the amount of data values that need to the consolidated, thus enhance the compression factor for the compression. The resulted DEM data set is, therefore, in a smaller volume comparing to conventional compression methods. This smaller volume of compressed DEM data set, as described elsewhere herein, provide the advantage of greater efficiency associated with the storage, transmission, and processing of the DEM data set. Additionally or alternatively, the tailored compression of DEM data sets provided by the methods and systems described herein may also lead to reduced costs for storage and transmission of the data. By reducing the amount of data that needs to be stored and transmitted, it may be possible to use less expensive storage and transmission solutions. Additionally, the use of tailored compression methods may lead to improved accuracy and precision (e.g., lossless) in the compressed data, for example, if being compared to the same-sized compressed data by conventional compression methods, because of the smaller size this tailored compression method may provide, the accuracy and precision of the present disclosure may be improved. This may be especially important for applications where the data is used for scientific or engineering purposes.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real-time," as used herein, generally refers to a simultaneous or substantially simultaneous occurrence of a first event or action with respect to an occurrence of a second event or action. A real-time action or event may be performed within a response time of less than one or more of the following: ten seconds, five seconds, one second, a tenth of a second, a hundredth of a second, a millisecond, or less relative to at least another event or action. A real-time action may be performed by one or more computer processors. Real-time, as used herein, generally refers to a response time that does not appear to be of substantial delay to a user as graphical elements are pushed to the user via a user interface. In some embodiments, a response time may be associated with processing of data, such as by a computer processor, and may be less than 2 seconds, 1 second, tenth of a second, hundredth of a second, a millisecond, or less. Real-time can also refer to a simultaneous or substantially simultaneous occurrence of a first event with respect to occurrence of a second event.

FIG. 1 is a block diagram depicting an example DEM data compression system 100, according to embodiments of the present disclosure, comprising a client-server architecture and network configured to perform the various methods described herein. A platform (e.g., machines and software, possibly interoperating via a series of network connections, protocols, application-level interfaces, and so on), in the form of a server platform 120, provides server-side functionality via a communication network 114 (e.g., the Internet or other types of wide-area networks (WANs), such as wireless networks or private networks with additional security appropriate to tasks performed by a user) to one or more client nodes 102, 106. FIG. 1 illustrates, for example, a client node 102 hosting a web extension 104, thus allowing a user to access functions provided by the server platform 120, for example, receiving an elevation map visualization from the server platform 120. The web extension 104 may be compatible with any web browser application used by a user of the client node. Further, FIG. 1 illustrates, for example, another client node 106 hosting a mobile application 108, thus allowing a user to access functions provided by the server platform 120, for example, receiving an elevation map visualization from the server platform 120. As depicted in FIG. 1, the client node 106 may be associated with a user who may be mobile, such as traveling on a highway, hiking or biking in a mountain, etc. In some circumstances, the communication connections in these scenarios may not always be stable, and may be in very low bandwidth. Therefore, the less data required to transmit for a map visualization, the better user experience it may present. The compression methods and systems described herein may predict the values of pixels in the DEM data set based on the characteristics of the surrounding pixels. By utilizing these advanced techniques, the compression methods and systems can ensure that the compressed DEM data set retains accuracy and information while being significantly smaller in data size. For example, the tailored compression method may provide a compressed data set that is 10%, 20%, 30%, 40%, 50%, 60%, 70%, 80%, 90% smaller than the conventional compression method would provide. In some embodiments, delivery of the elevation map visualization and other communications may be through a wired or wireless mode of communication.

A client node (e.g., client node 102 and/or client node 106) may be, for example, a user device. Examples of a user device may comprise a mobile electronic device, such as smart phones, cell phones, tablets, personal digital assistants, etc. In some embodiments, examples of a user device map comprise a stationary electronic device, such as desktops, laptops, etc. Examples of a user device may also comprise wearable devices such as smart watches, smart glasses, etc. These user devices are network enabled via various protocols, such as BGP, DHCP (v6), DNS, FTP, HTTP, HTTPS, IMAP, LAN, WAN, 4G, 5G, LTE, etc. A client node may be associated with, and/or be accessible to, a user. In another example, a client node may be a computing device (e.g., server) accessible to, and/or associated with, an individual or entity. A client node may comprise a network module (e.g., network adaptor) configured to transmit and/or receive data. Via the nodes in the computer network, multiple users and/or servers may communicate and exchange data, such as a viewshed visualization, interactive position data, and the like.

In at least some examples, the server platform 120 may be one or more computing devices or systems, storage devices, and other components that include, or facilitate the operation of, various execution modules depicted in FIG. 1. These modules may include, for example, DEM data set receiver 124, DEM data set prediction difference recorder 126, DEM data set prediction difference render engine 128, data access modules 142, and data storage 150. Each of these modules is described in greater detail below.

The DEM data set receiver 124 may be configured to receive and/or obtain DEM data set associated with an area. In some embodiments, the DEM data associated with an area (e.g., a portion of the terrain, a subset of the terrain, a group of terrains) is indicative of the heights associated with each location of the terrain, respectively. In some embodiments, the DEM data set may be obtained from the National Election Dataset (NED). The NED dataset is a compilation of data from a variety of existing high-precision datasets such as LiDAR data (see also National LIDAR Dataset-USA), contour maps, USGS DEM collection, SRTM and other sources which were reorganized and combined into a seamless dataset, designed to cover all the United States territory in its continuity. In addition to the National Elevation Dataset (NED), the DEM data set may be obtained from the Shuttle Radar Topography Mission (SRTM), which is a global elevation model that covers the entire world, with a resolution of 1 arc-second (approximately 30 meters) for most regions. Another source may be the Advanced Spaceborne Thermal Emission and Reflection Radiometer (ASTER) Global Digital Elevation Model (GDEM), which covers the entire earth and has a resolution of 30 meters. In some embodiments, commercial sources for DEM data sets may be utilized, such as DigitalGlobe and Airbus Defense and Space. Additionally, some countries may have their own national data sets, such as the Canadian Digital Elevation Model (CDEM) and the United Kingdom's Ordnance Survey Terrain 50 data set. The DEM data set may be available in various data formats, such as ESRI ArcGRID, GeoTIFF, BIL, GridFloat, and the like.

The DEM data set prediction difference recorder 126 (i.e., error recorder 126) may be configured to record the prediction difference on a matrix table, according to embodiments in the present disclosure. As described elsewhere herein, DEM data set may comprise a matrix of numbers (values), each represents a height (e.g., elevation value) corresponding to a location point (e.g., a pixel in an elevation map). The DEM data set prediction difference recorder 126 may receive the DEM data set from the DEM data set receiver 124 for further processing. Once received the DEM data set, the DEM data set prediction difference recorder 126 may make predictions regarding the value associated with pixels next to a first and a second pixel. Details regarding the value prediction process are described, for example, in connection with FIG. 2b by reference to an example prediction process 200. In some embodiments, the DEM data set prediction difference recorder 126 may further record the differences (i.e., errors) between the predicted value and the actual value in the DEM data set matrix. Details regarding the prediction difference recording process is described, for example, in connection with FIG. 3b by reference to an example prediction difference recording table 302.

The DEM data set prediction difference render engine 128 may be configured to render a prediction difference recording table, e.g., the prediction difference recording table 302, into an elevation map that may be in a human-comprehensible manner. In some embodiments, the DEM data set prediction difference may be encoded into a graphical manner wherein different values in the DEM data matrix may be encoded by showing as graphically-distinguishable between different values. In some embodiments, the distinguishable feature may be the intensity of the shade of the color in a greyscale scales. In some embodiments, the distinguishable feature may be represented by different colors or intensity of the color. In some embodiments, the intensity of a color refers to the brightness or darkness of a color. It may be indicative of the amount of light or dark shades in the color, and can range from very light to very dark. For example, intensity may be used to convey different levels of information or emphasis in data visualizations, such as in color-coded maps, where brighter colors may indicate higher values or greater significance. In the context of an elevation map, intensity of a color may be used to represent the magnitude of change in elevation or slope between adjacent pixels, with darker colors indicating steeper areas and lighter colors indicating flatter terrain. In some embodiments, the distinguishable feature may be represented by a 3D model of the terrain, which may provide a more immersive and interactive representation of the elevation data. In some embodiments, a combination of different shades, intensities, colors may be utilized to provide representation of the distinguishable features that provides a human-comprehensible visualization of the DEM data set.

Data access modules 142 may facilitate access to data storage 150 of the server platform 120 by any of the remaining modules/engines 124, 126, and 128 of the server platform 120. In one example, one or more of the data access modules 142 may be database access modules, or may be any kind of data access module capable of storing data to, and/or retrieving data from, the data storage 150 according to the needs of the particular module 124, 126, and 128 employing the data access modules 142 to access the data storage 150. Examples of the data storage 150 include, but are not limited to, one or more data storage components, such as magnetic disk drives, optical disk drives, solid state disk (SSD) drives, and other forms of nonvolatile and volatile memory components.

Figure 2A:
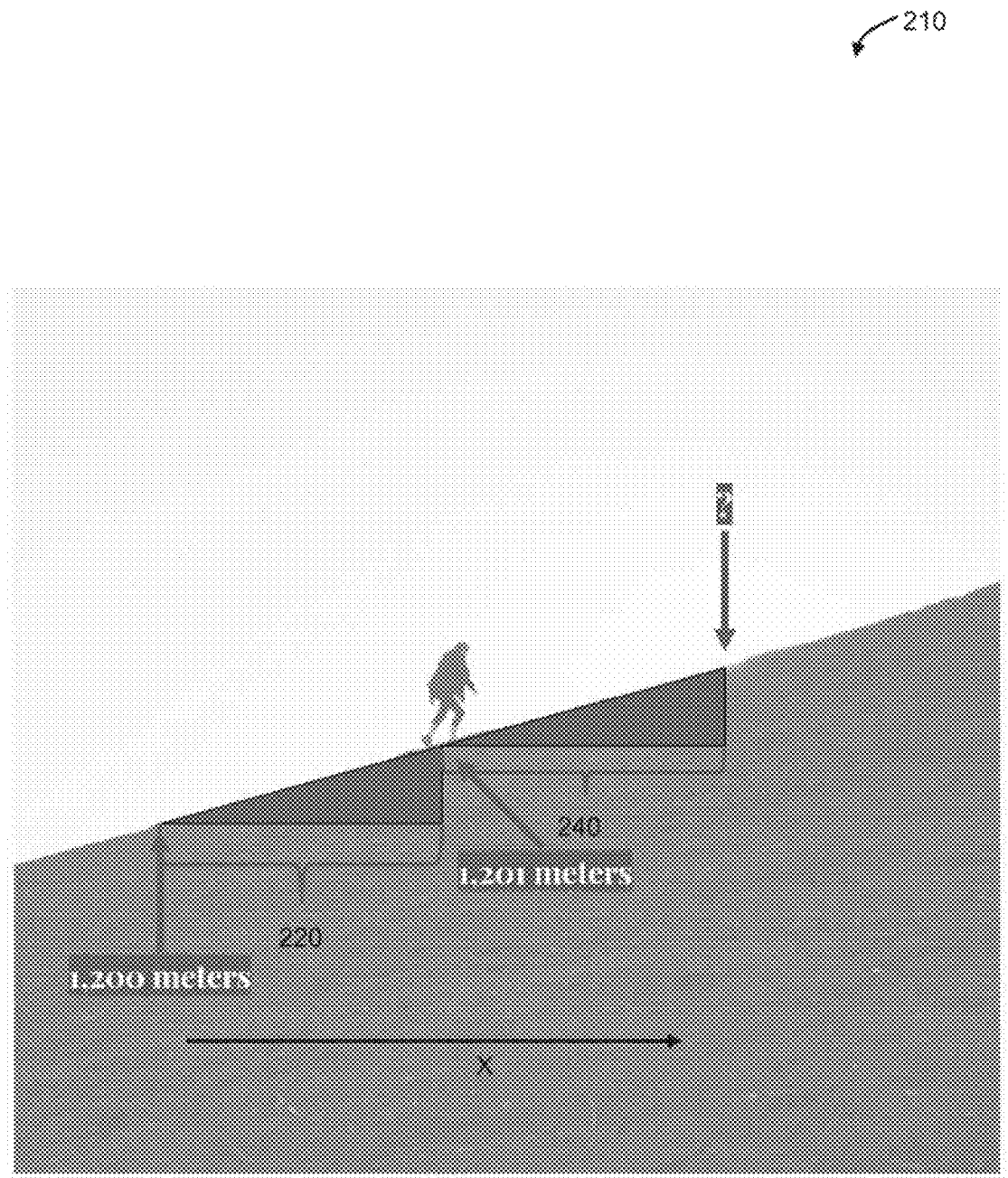
FIG. 2a is a diagram depicting the predicable nature associated with certain DEM data sets.

FIG. 2a is a diagram depicting the predicable nature associated with certain DEM data sets. As described elsewhere herein, a mountain range largely consists of a number of slopes, and these slopes may be in same or similar degree of leaning or tilting for most portions of them. As depicted in FIG. 2a, the elevation of a slope 210 generally increases by a similar amount across a fixed distance along a certain direction. For example, distance 220 and distance 240 may represent same amount of length along the direction X. A first elevation accretion (e.g., elevation gain) associated with distance 220 may be Y1, and a second elevation accretion associated with distance 240 may be Y2. A rise over run may be represented by the elevation accretion Y divided by the distance it covered, e.g., Y1/distance 220, or Y2/distance 240. In some embodiments, because a slope may be tilting in same or similar degree for most portions of it, this rise over run may be a fixed number for most portions of it. As depicted in FIG. 2a, the elevation accretion associated with distance 220 may be 1 meter (as shown in FIG. 2a, 1,201 meters minus 1,200 meters). Based on this property of the data set, a prediction may be made for the next distance 240 that runs the same length as distance 220 along the same direction X, and the elevation accretion associated with distance 240 should be similar to 1 meter. This "rise over run" prediction associated with the DEM data set, which represents a valuable characteristic of the data set, may be utilized to compress DEM data set, as described with reference to other figures.

Figure 2B:
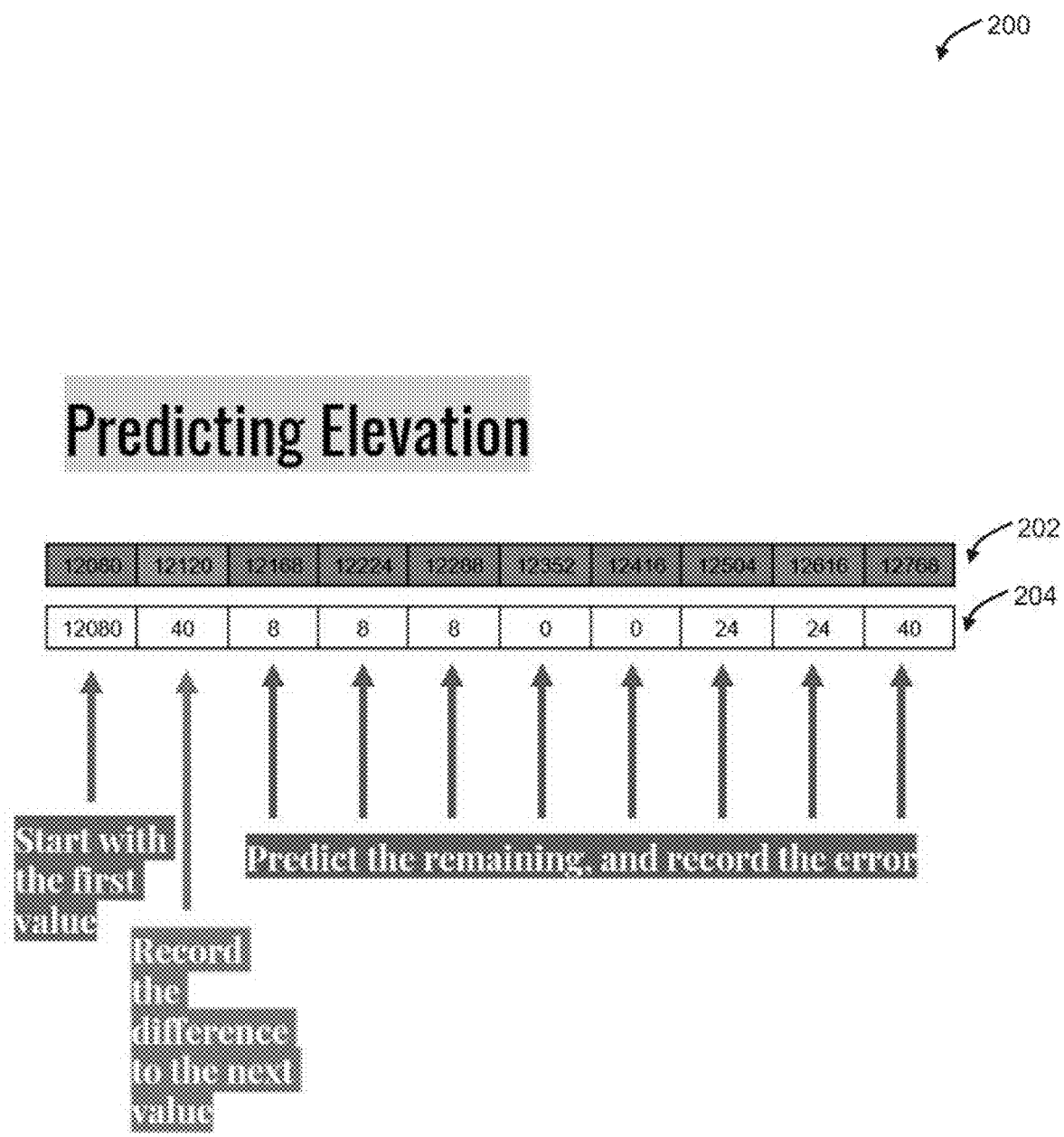
FIG. 2b is a diagram depicting an example prediction process 200 for DEM data set compression.

FIG. 2b is a diagram depicting an example prediction process 200 for DEM data set compression. As depicted in FIG. 2b, the actual value of the one row of the matrix of the DEM set are shown by reference number 202. The prediction differences are recorded in another row, which is represented by reference number 204. The prediction differences represent the differences between a predicted value and the actual value in the DEM data set matrix, which is also referred to as "error". A prediction process may start with a first actual value in the DEM data set matrix, and the difference between the first actual value and a second actual value may be recorded and deployed later to make a next prediction. For example, a prediction process may start with the first value, which is "12080" as depicted in an example shown in FIG. 2b. The difference between the first value and the second value is recorded in the second box of the predicted values, in this case, is 12120 minus 12080, results in a "40". The rest of the prediction will be based on the differences between the predicted value (i.e., would-be value is the slope is with a rise-by-run constant) and the actual value. For example, based on the value "40", the system may predict the next elevation gain would also be "40". However, the difference between the third actual value "12168" and the second actual value "12120" is "48". This means the prediction is 8 (i.e., 48−40=8) short from the actual change of numbers. Then the third box of the predicted differences 204 may record a "8", which represents the prediction error. Next, the predicted elevation gain changed from "40" to "48", i.e., this predicted elevation gain may be adaptable or automatically updated. The predicted value gain (i.e., the predicted elevation gain) may be an intermediate value and may be indicative of an expected value gain between two adjacent pixels. This predicted value gain may be a negative value. Based on this new predicted elevation gain, which has an updated value "48", the system may now predict the next elevation gain would be "48". However, the difference between the fourth actual value "12224" and the third actual value "12168" is "56". This means the prediction is 8 (i.e., 56−48=8) short from the actual change of numbers. Then the fourth box of the predicted differences 204 may record a "8", which represents the prediction error. This process repeats until all the prediction errors are recorded in the prediction differences row 204.

Figures 3A, 3B:
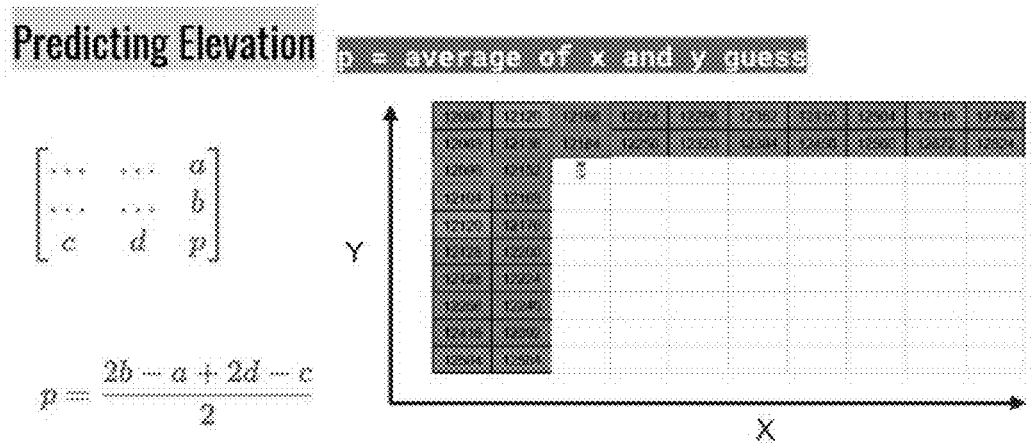
FIG. 3a is a diagram depicting an example prediction process for DEM data set compression.
FIG. 3b is a diagram depicting an example prediction difference recording table 302 for DEM data set compression.

FIG. 3a is a diagram depicting an example prediction process for DEM data set compression. In some embodiments, a value may be calculated/predicted by the values adjacent to it in the data set matrix. For example, according to some embodiments, a value may be calculated/predicted by the values next to it, e.g., the values right above the being-predicted pixel in the matrix. In the DEM data set matrix, according to some embodiments, a value may be calculated/predicted by the values next to it, e.g., the values right on the left to the being predicted pixel. In some embodiments, in the DEM data set matrix, a value may be calculated/predicted by the values next to it along more than one directions, e.g., two different directions (horizontally, vertically, etc.), three different directions (horizontally, vertically, diagonally, etc.). For example, as depicted in FIG. 3a, a value p in the matrix representing the DEM data set may be calculated/predicted by the values along two different directions, i.e., the X axis and the Y axis. In some embodiments, the value p may be calculated by two values above it, i.e., values a and b along the Y axis, and two values on the left of it, i.e., values c and d along the X axis using the exemplary formula shown in FIG. 3a. The formula is only presented as an example, and other formulas may be utilized to perform/achieve this calculation/prediction. The predicted value and the resulted differences between prediction and the actual value may be recorded in a prediction difference recording table 302, as shown in FIG. 3b.

FIG. 3b is a diagram depicting an example prediction difference recording table 302 for DEM data set compression. As depicted in FIG. 3b, the method provided herein may first calculate/predict the first two or more rows for the matrix representing the DEM data set, then calculate/predict the first two or more columns of the matrix representing the DEM data set. The errors (i.e., the difference between the predicted value and the actual value) is recorded in this prediction difference recording table 302 for further processing. It should be noted that although two rows/columns are first utilized to calculate/predict in the above example, the method described herein may utilize different number of rows/columns as the starting data set, being utilized to accomplish the DEM data set compression described herein. It should be noted that although the sequences of from left to right, from top to bottom prediction is described in the above example, any sequences of prediction may be utilized to accomplish the DEM data set compression described herein, for example, 1) from left to right, then from bottom to top; 2) from right to left, then from top to bottom; 3) from right to left, then from bottom to top; 4) from top to bottom, then from left to right; 5) from top to bottom, then from right to left; 6) from bottom to top, then from left to right; 7) from bottom to top, then from right to left, or 8) from the middle out, etc.

As described in connection with FIG. 3b, the prediction difference recording table 302 records the "error" in the prediction, i.e., the difference between the predicted value and the actual value. Therefore, this prediction difference recording table 302 may naturally comprise a large number of small values, such as 0. In some embodiments, when encoding a mountain range of 50 square kilometers, the value "0" may repeat more than 30,000 times. This attribute of data set of the prediction difference recording table 302 may significantly reduce the memory storage required to perform the DEM data set compression and encoding process. Further, because the prediction difference recording table 302 may record the difference between the predicted and actual values, it can be used to improve the accuracy of the DEM data set by automatically adjusting the predictions over time (as described herein elsewhere, the prediction elevation gain may be automatically adaptable). This may lead to a more accurate representation of the terrain and its features.

Figure 4:
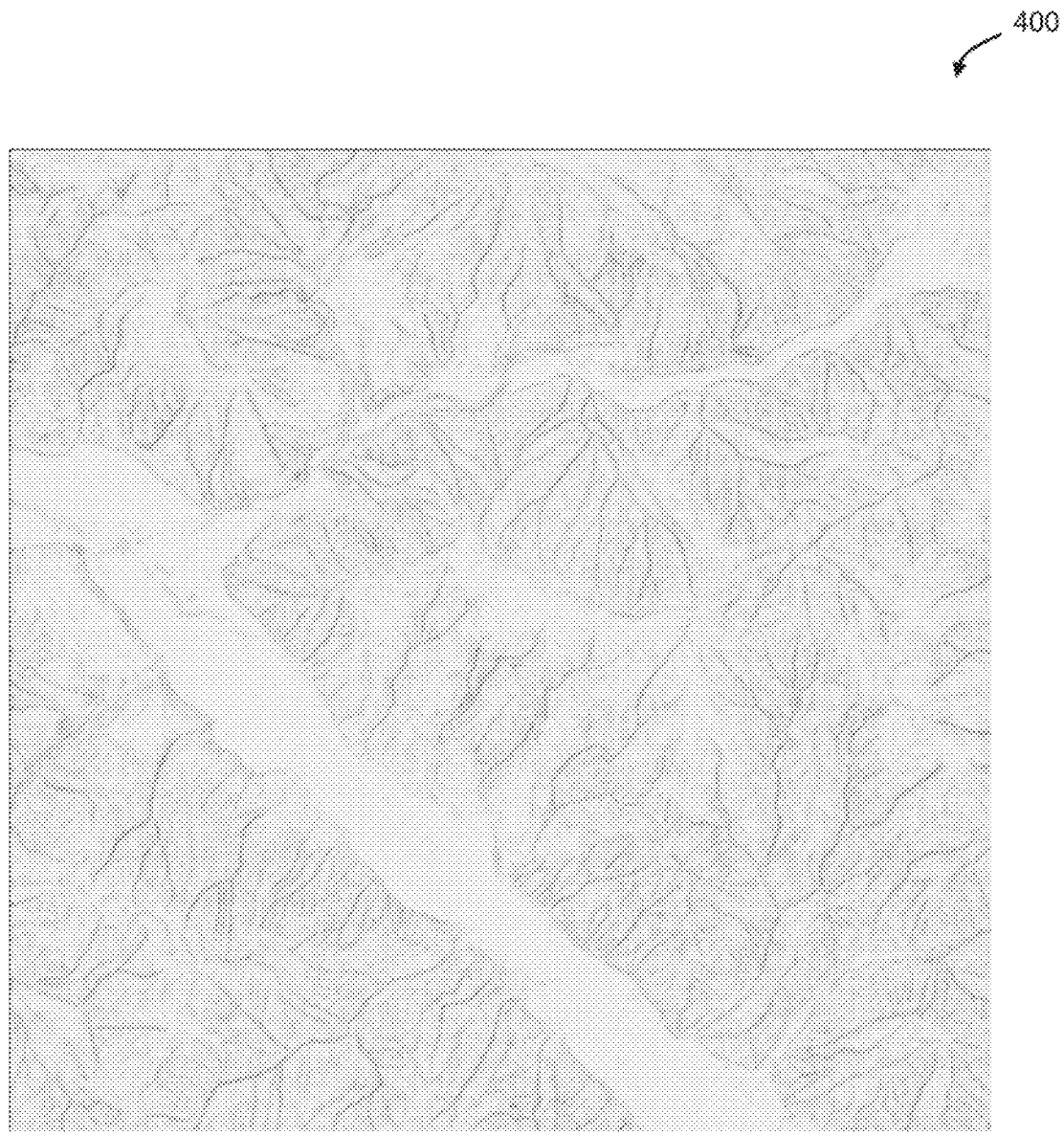
FIG. 4 is a diagram depicting a human-comprehensible visualization of the compressed DEM data set.

FIG. 4 is a diagram depicting a human-comprehensible visualization of the DEM data set. As discussed elsewhere herein, the visualization of DEM data set may be in a form of a contoured topographic map, or use shadings and colors to render elevation information as represented by visually distinct format, such as colors, lines, etc. A contoured topographic map may comprise contour lines, or lines which connect points of equal elevation, what are drawn on a topographical map in order to quantify the elevation at any point on the map. In some embodiments, colors may indicate the difference between elevations of two adjacent pixel which may represent location. As depicted in FIG. 4, the DEM data set may be encoded into a graphical manner wherein different values in the DEM data matrix may be encoded by showing as graphically-distinguishable between different values. In some embodiments, the distinguishable feature may be different shades. In some embodiments, the distinguishable feature may be the intensity of the shade of the color in a greyscale scales. In some embodiments, the distinguishable feature may be represented by different colors or intensity of the color. In some embodiments, the intensity of a color refers to the brightness or darkness of a color. It may be indicative of the amount of light or dark shades in the color, and can range from very light to very dark. For example, intensity may be used to convey different levels of information or emphasis in data visualizations, such as in color-coded maps, where brighter colors may indicate higher values or greater significance. In the context of an elevation map, intensity of a color may be used to represent the magnitude of change in elevation or slope between adjacent pixels, with darker colors indicating steeper areas and lighter colors indicating flatter terrain. In some embodiments, the distinguishable feature may be represented by a 3D model of the terrain, which may provide a more immersive and interactive representation of the elevation data. In some embodiments, the distinguishable feature may be represented by a 3D model of the terrain, which may provide a more immersive and interactive representation of the elevation data. In some embodiments, a combination of different shades, intensities, colors may be utilized to provide representation of the distinguishable features that provides a human-comprehensible visualization of the DEM data set.

Various computer graphics pipelines and application programming interfaces (APIs) may be utilized to encode the predicted difference table into visually distinct formats. These computer graphics pipelines and APIs comprise, without limitation, Direct3D, OpenGL, OpenVG, Direct2D, Quartz 2s, Simple DirectMedia Layer (SDL), Simple and Fast Multimedia Library (SFML), X11, and the like. The human-comprehensible visualization of the DEM data set may be in various data format, for example, Animated Portable Network Graphics (APNG), AV1 Image File Format (AVIF), Graphics Interchange Format (GIF), Joint Photographic Expert Group image (JPEG), Portable Network Graphics (PNG), Scalable Vector Graphics (SVG), and Web Picture format (WebP). Different lossless image compression formats can be chosen to take advantage of the recorded prediction error values to achieve the best compression factor.

In some embodiments, the human-comprehensible visualization of the compressed DEM data set, as depicted in FIG. 4, may be encoded into a WebP format. A WebP format of elevation map may be able to show different intensities of colors representing the distinguishable features. As described elsewhere herein, the greater the "error" in the prediction, i.e., the difference between the predicted value and the actual value, the steeper (or less steep) a portion of the slope is comparing to the surrounding areas (hence the error is greater because the prediction may be more off than other areas). The prediction error accentuates when reaching the top of a mountain or the bottom of a valley, as well as a cliff. In an elevation map (i.e., the visualization of the DEM data set), the steeper areas may be encoded into darker colors, as depicted in FIG. 4. In some embodiments, a darker color may be assigned to a greater value in the prediction difference (error) data set. For example, a blacker color may be indicative of a greater error in prediction, hence a steeper area than the surrounding areas. In some embodiments, a contract of the adjacent colors may be indicative of the intensity of the error, i.e., the magnitude of change in value between adjacent pixels. For example, a black color pixel next to a light-grey color pixel may be indicative of a high magnitude of change in value of the two pixels, and hence a steeper slop change than the surrounding areas. In some embodiments, the prediction errors in an elevation map may be represented through the use of a color ramp or color gradient. For example, different colors may be assigned to different ranges of values in the prediction error data set. In some embodiments, shades of blue or green could represent low values (indicating a flatter terrain), while shades of red or orange could represent high values (indicating steeper areas). The color gradient may be adjusted to show finer details in the terrain, such as changes in slope or elevation. Additionally, contour lines or hill shading could be combined with the color ramp to provide a more comprehensive representation of the terrain and its features.

Figure 5:
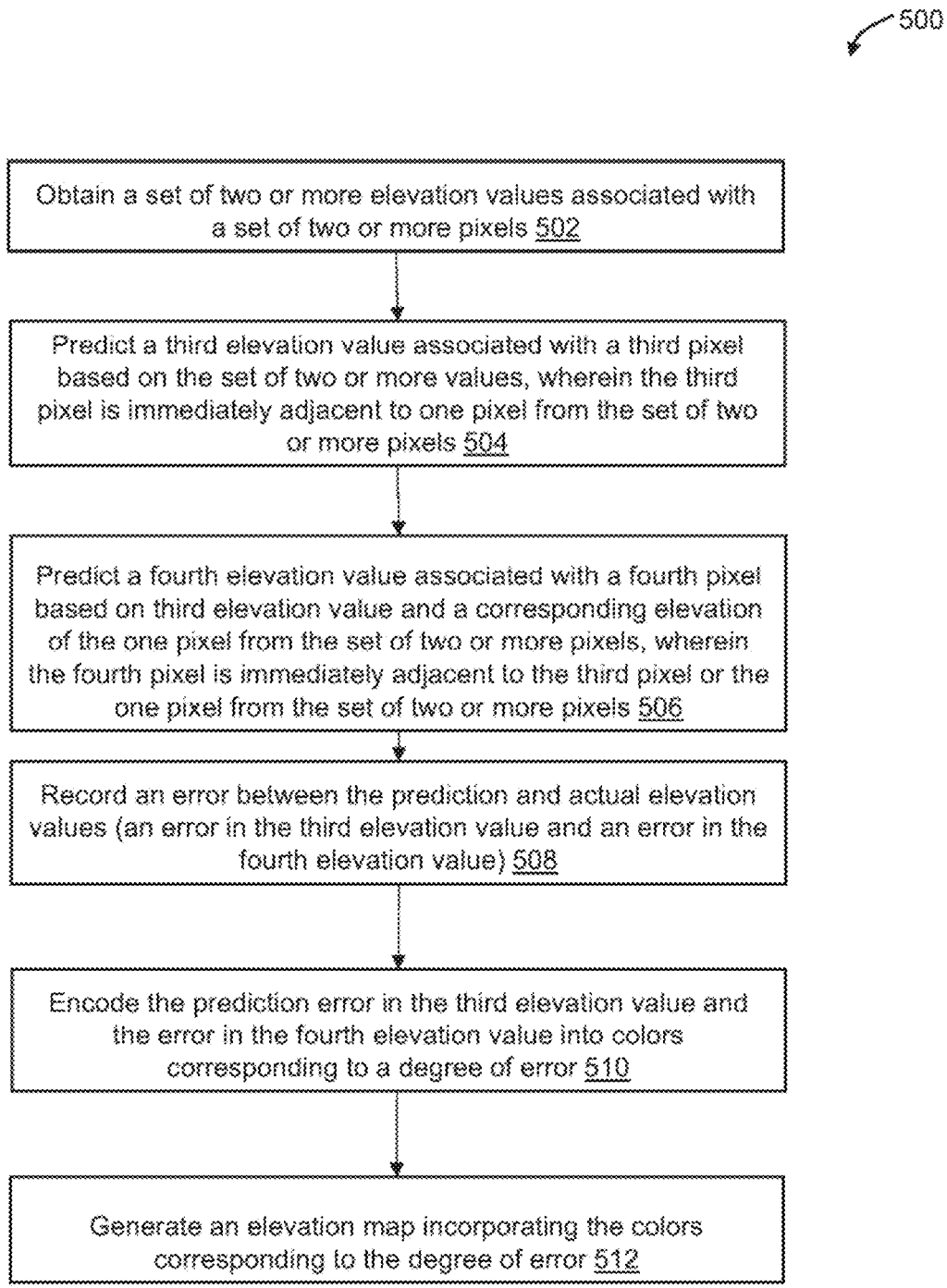
FIG. 5 is a flow diagram depicting an example process 500 for DEM data set compression.

FIG. 5 is a flow diagram depicting an example process 500 for DEM data set compression. As depicted in FIG. 5, once the platforms and systems of the present disclosure is initialized, the process 500 begins with operation 502, wherein the compression system obtains a set of two or more elevation values associated with a set of two or more pixels. In some embodiments, the DEM data set receiver 124 of server platform 120 as described in connection with FIG. 1 may be configured to receive and/or obtain DEM data set associated with an area. In some embodiments, this two or more elevation values may be the first two or more elevation values in the first row of the DEM data set matrix. In some embodiments, this two or more elevation values may be the first two more elevation values in the first column of the DEM data set matrix. Next, the process 500 may proceed to operation 504, wherein the compression system may predict a third elevation value associated with a third pixel based on the set of two or more values, wherein the third pixel is immediately adjacent to one pixel from the set of two or more pixels. In some embodiments, the DEM data set prediction difference recorder 126 of server platform 120 described in connection with FIG. 1 may predict a third elevation value associated with a third pixel based on the set of two or more values. In some embodiments, the third pixel is immediately adjacent to one pixel from the set of two or more pixels. For example, as depicted in FIG. 2b, a value associated with a third pixel is predicted based on the values associated with the first and the second pixels. In some embodiments, this third elevation value may be predicted based on an additional set of two or more values from another direction (i.e., axis) in addition to the obtained set of two or more values. For example, referring back to FIG. 3a, the value p may in the matrix representing the DEM data set may be calculated/predicted by the values along two different directions, i.e., the X axis and the Y axis. The value p may be calculated by two values above it, i.e., values a and b along the Y axis, and two values on the left of it, i.e., values c and d along the X axis.

Next, the process 500 may proceed to operation 506, wherein the compression system may predict a fourth elevation value associated with a fourth pixel based on the third elevation value and a corresponding elevation of the one pixel from the set of two or more pixels, wherein the fourth pixel is immediately adjacent to the third pixel or the one pixel from the set of two or more pixels. For example, the DEM data set prediction difference recorder 126 of server platform 120 described in connection with FIG. 1 may predict the fourth elevation value based on the third elevation value and a corresponding elevation of the one pixel from the set of two or more pixels. In some embodiments, as depicted in FIG. 2b, a value associated with a fourth pixel is predicted based on the values associated with a previous prediction, and the actual values associated with the first, second, and the third pixels, or a combination thereof.

Next, the process 500 may continue to operation 508, wherein the compression system may record an error between the prediction and actual elevation values, more specially, an error in the third elevation value and an error in the fourth elevation value. In some embodiments, the DEM data set prediction difference recorder 126 of server platform 120 described in connection with FIG. 1 may record the prediction difference (i.e., "an error") in a recording table, such as the recording table 302 as shown in FIG. 3b. This operation 508 is described with more details in connection with FIG. 3b. Next, the process 500 may proceed to operation 510, wherein the system may encode the error in the third elevation value and the error in the fourth elevation value into colors corresponding to a degree of error. The DEM data set prediction difference render engine 128 of server platform 120 described in connection with FIG. 1 may render a prediction difference recording table, e.g., the prediction difference recording table 302, into an elevation map that may be in a human-comprehensible manner. In some embodiments, the DEM data set prediction difference may be encoded, in operation 510, into a graphical manner wherein different values in the DEM data matrix may be encoded by showing as graphically-distinguishable between different values. In some embodiments, the distinguishable feature may be the intensity in a greyscale scales. In some embodiments, the distinguishable feature may be represented by different colors. In some embodiments, a combination of different shades, intensities, colors may be utilized to provide representation of the distinguishable features that provides a human-comprehensible visualization of the DEM data set. The selection of the colors used to represent various elevations allow general purpose image compression algorithms to work more efficiently on compressing the DEM.

As discussed in connection with FIG. 4, this error represents the difference between the prediction value and the actual value, and therefore expresses the outliers/sudden changes in the elevation of a slope. By encoding the error values into colors, the system described herein generates an elevation map that shows a human-comprehensible visualization of the DEM data set. The process 500 may then continue to operation 512, wherein the system generates an elevation map incorporating the colors corresponding to the degree of error.

Computer Systems

Figure 6:
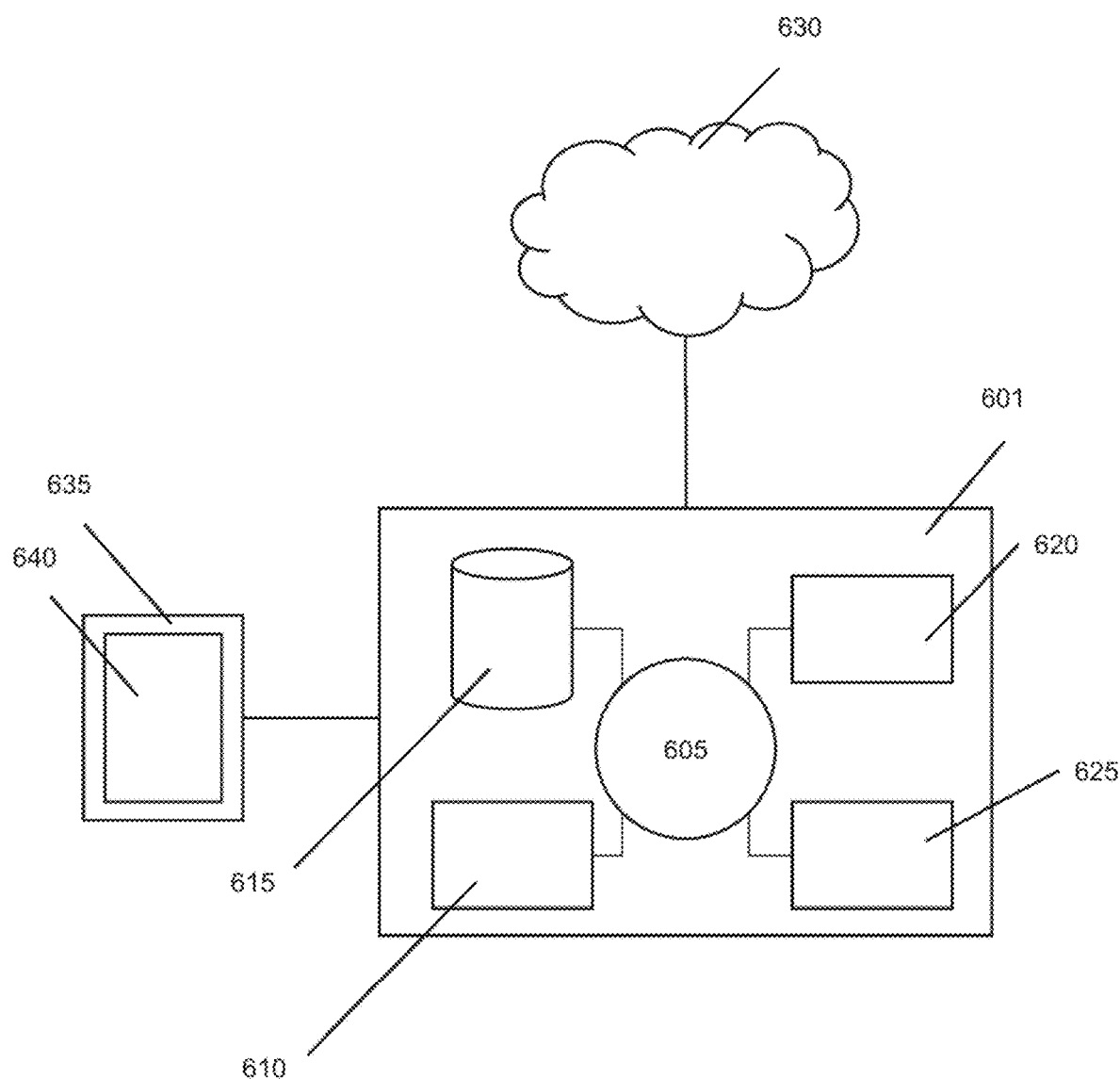
FIG. 6 shows a computer system that is programmed or otherwise configured to implement methods provided herein.

The present disclosure provides computer systems that are programmed to implement methods of the disclosure. FIG. 6 shows a computer system 601 that is programmed or otherwise configured to provide DEM data set compression. The computer system 601 can regulate various aspects of the present disclosure. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for reducing network traffic by compressing map data, comprising:
    a data set receiver configured to obtain an elevation data set comprising a subset of the map data, wherein the elevation data set comprises a first set of two or more elevation values associated with a first set of two or more pixels obtained or derived from the subset of the map data;
    a prediction difference recorder configured to:
        (a) obtain the first set of two or more elevation values;
        (b) generate a next predicted elevation pixel value associated with a next predicted elevation pixel for inclusion in the elevation data set, wherein the next predicted elevation pixel value is generated based on the first set of two or more elevation values, wherein the next predicted elevation pixel is immediately adjacent to one of the first set of two or more elevation pixels;
        (c) generate a further next predicted elevation pixel value associated with a further next predicted elevation pixel for inclusion in the elevation data set, wherein the further next predicted elevation pixel value is generated based on the next predicted elevation pixel value and next predicted elevation pixel of (b), wherein the further next predicted pixel is immediately adjacent to one of the first set of previous two or more predicted elevation pixels, the next predicted elevation pixel of (b), or both;
        (d) determine an error value between the predicted next elevation pixel value and the predicted further next elevation pixel value of the elevation data set; and
        (e) generate an elevation error data set for each of the first two or more pixels comprising the error value determined in (d); and
    a render engine configured to (i) receive one or more determined error values of the elevation error data set from the prediction difference recorder, and (ii) encode the one or more determined error values into colors, wherein the colors represent a change in an elevation slope relative to a predicted elevation slope.

2. The system of claim 1, wherein the prediction difference recorder is further configured to, subsequent to (c), compare the next predicted elevation value and the further next predicted elevation pixel value to an actual elevation value associated with one or more respective pixels.

3. The system of claim 1, wherein different colors are assigned to a different value of the error value.

4. The system of claim 3, wherein a darker color is assigned to a greater value of the error value.

5. The system of claim 3, wherein a contrast between adjacent colors is indicative of an intensity of a change in the determined error values of the elevation error data set.

6. The system of claim 5, wherein the intensity of the change in the determined error values is indicative of a magnitude of the change in the determined error values between adjacent pixels.

7. The system of claim 1, wherein different color ranges are assigned to different value ranges of the determined error values.

8. The system of claim 1, wherein the render engine is further configured to generate an elevation map using the encoded colored error.

9. The system of claim 1, wherein a predicted value gain is automatically updated, wherein the predicted value gain is an intermediate value and is indicative of an expected value gain between two adjacent pixels.

10. A method for reducing network traffic by compressing map data using one or more computer processors, comprising: (a) obtaining, by the one or more computer processors, an elevation data set comprising a subset of the map data, wherein the elevation data set comprises a first set of two or more elevation values associated with a first set of two or more pixels obtained or derived from the subset of the map data; (b) generating, by the one or more computer processors, a next predicted pixel elevation value associated with a next predicted pixel for inclusion in the elevation data set, based on the first set of two or more elevation values, wherein—the next predicted elevation pixel is immediately adjacent to one of the first set of two or more elevation pixels; (c) generating, by the one or more computer processors, a further next predicted elevation pixel value associated with a further next predicted elevation pixel for inclusion in the elevation data set, based on the first set of two or more elevation values associated with the first set of two or more elevation pixels, and the further next predicted elevation value, wherein the further next predicted elevation pixel is immediately adjacent to one of the first set of two or more pixels or the next predicted elevation pixel; (d) determining, by the one or more computer processors, an error value between the predicted next elevation pixel value and the further next predicted elevation pixel value of the elevation data set; (e) generating an elevation error data set for each of the first two or more pixels comprising the error value determined in (d); (f) receiving, via a render engine, one or more determined error values of the elevation error data set from a prediction difference recorder; and (g) encoding, via the render engine, the one or more determined error values into colors, wherein the colors represent a change in an elevation slope relative to a predicted elevation slope.

11. The method of claim 10, wherein (d) further comprises comparing the predicted next elevation value and predicted further next elevation value to an actual elevation value associated with one or more respective elevation pixels.

12. The method of claim 10, wherein (g) further comprises assigning different colors to different values of the one or more determined error values.

13. The method of claim 12, wherein (g) further comprises assigning a darker color to a greater value of the one or more determined error values of the elevation error data set.

14. The method of claim 12, wherein a contrast of adjacent colors is indicative of an intensity of a change in the determined error values.

15. The method of claim 14, wherein the intensity of the change in the determined error values is indicative of a magnitude of change in the error values between adjacent pixels.

16. The method of claim 10, wherein (g) further comprises assigning different color ranges to different value ranges of the error values.

17. The method of claim 10, wherein (g) further comprises generating an elevation map using the encoded colored error values via a render engine.

18. The method of claim 10, further comprising automatically updating a predicted value gain, wherein the predicted value gain is an intermediate value and is indicative of an expected value gain between two adjacent pixels.

* * * * *